United States Patent [19]

Rusch

[11] Patent Number: 4,464,745
[45] Date of Patent: Aug. 7, 1984

[54] HIGH DYNAMIC RANGE MULTIPLEXING SYSTEM

[75] Inventor: William T. Rusch, Hollis, N.H.

[73] Assignee: Sanders Associates, Inc., Nashua, N.H.

[21] Appl. No.: 325,400

[22] Filed: Nov. 27, 1981

[51] Int. Cl.³ .................................................. H04J 11/00
[52] U.S. Cl. ........................................ 370/19; 370/20; 340/870.11
[58] Field of Search .................... 370/19, 20; 340/850, 340/852, 857, 870.11

[56] References Cited

U.S. PATENT DOCUMENTS

| | | | |
|---|---|---|---|
| 3,364,466 | 1/1968 | Stine | 340/870.11 |
| 3,735,266 | 5/1973 | Amitay | 370/20 |
| 3,826,868 | 7/1974 | Nugent | 340/870.11 |
| 3,858,191 | 12/1974 | Neuner et al. | 340/870.11 |
| 4,316,058 | 2/1982 | Christensen | 370/20 |
| 4,347,616 | 8/1982 | Murakami | 370/20 |

OTHER PUBLICATIONS

Wantzelius et al., "Labor-Saving 7-Channel Data Averager Printer for Cardiovascular and Other Physiological Signals", Med. & Bio. Eng. & Comput., 1978, pp. 73-77.
"Contactless Transmission System Handles of Eight Parameters at Once", Design Eng., Jun. 1978, p. 15.
Costa et al., "Multichannel Data Acquisition System for the Survey of Intercostal Muscle Activity", Med. & Bio. Eng. & Comput., Jul. 1980, pp. 447-449.

*Primary Examiner*—Douglas W. Olms
*Assistant Examiner*—Wellington Chin
*Attorney, Agent, or Firm*—Louis Etlinger; Richard I. Seligman

[57] ABSTRACT

This invention is a system that is capable of having a high dynamic range for the transmission of electrical information from an array of sensing devices to processing equipment via transmissions paths. A high gain quadrature multiplexer is coupled to the output of each pair of adjacent sensing devices and a low gain quadrature multiplexer is coupled to the output of each pair of adjacent sensing devices. The foregoing is arranged in such a manner that each sensing device is coupled to one channel of the multiplexer near it and to one channel of the adjacent multiplexer. A quadrature demultiplexer is coupled to the output of the high gain multiplexer and another quadrature demultiplexer is coupled to the output of the low gain multiplexer so that the faint signals received by the sensing devices will be passed to certain processing equipment through high gain channels and the loud signals detected by the sensing devices will be passed to processing equipment via low gain channels.

11 Claims, 1 Drawing Figure

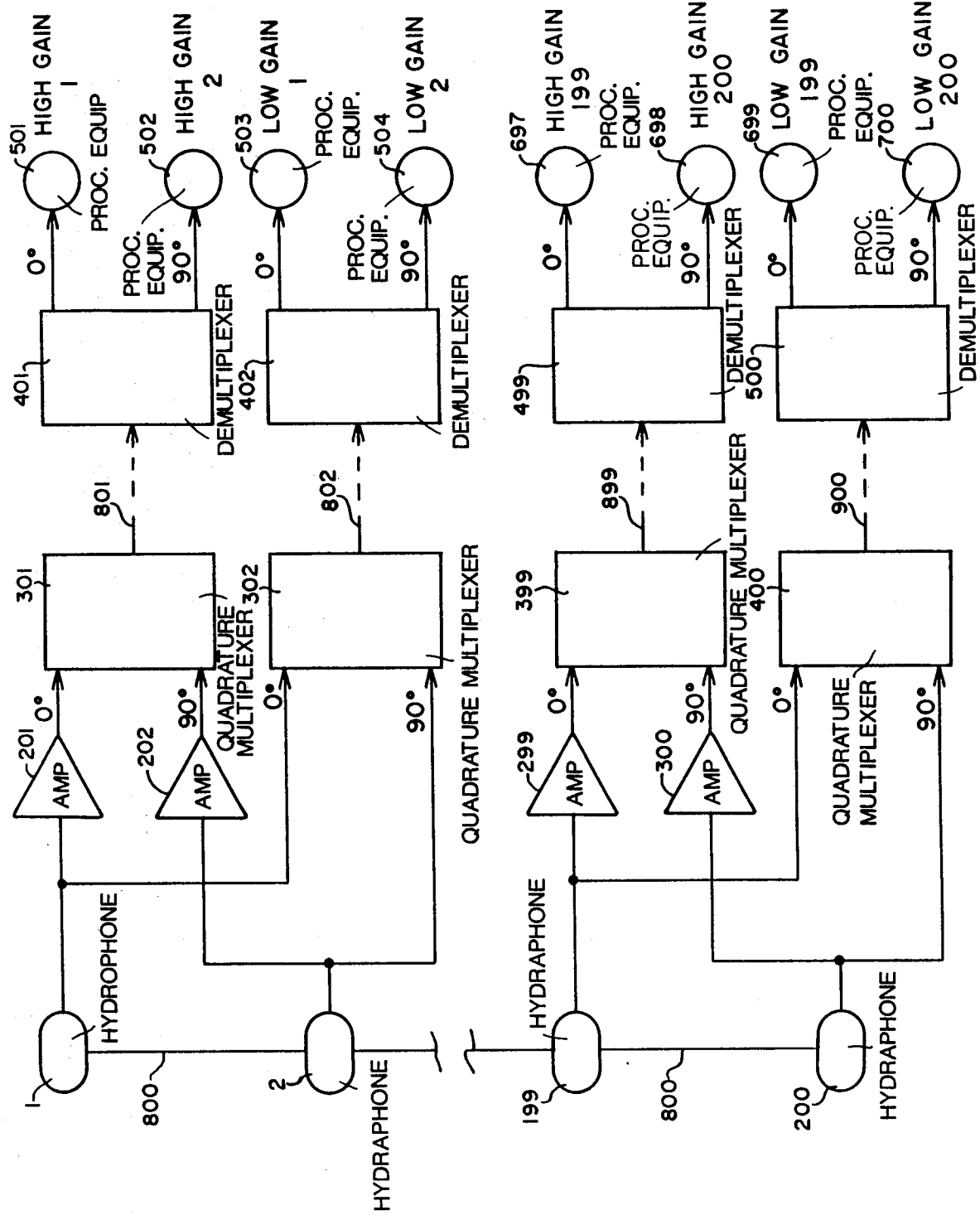

HIGH DYNAMIC RANGE MULTIPLEXING SYSTEM

FIELD OF THE INVENTION

This invention relates to detection systems and, more particularly, to the transmission of electrical information having large dynamic range capability from sensing devices to processing equipment.

BACKGROUND OF THE INVENTION

As the art of naval warfare progresses, underwater sound detection equipment is required to detect fainter and fainter sounds at greater and greater distances. In order to detect underwater sounds the prior art deployed a plurality of hydrophones arranged in an array beneath the surface of the water as far removed as possible from foreign powers' ships. The array of hydrophones were deployed in a straight line beneath the surface of the water by stringing the hydrophones along a cable. The cable was towed by a surface ship, submarine, thruster or low flying helicopter.

In the past, each hydrophone of some arrays was hardwired to processing equipment that was at the end of the array cable. One of the disadvantages of the foregoing was that a separate wire had to be connected from each hydrophone to the processing equipment and when the array was large, i.e., 100 or more hydrophones, 100 or more wires had to be connected to the processing equipment. The many additional wires made the array heavy and it became difficult to keep the hydrophones in a straight line since the weight of the wires caused the array cable to bend. Thus, the number of hydrophones in the array had to be small because the processing equipment assumed that the hydrophones were in a straight line.

Another technique of the prior art for transmitting signals from hydrophones to processing equipment utilized multiplexing techniques. The multiplexing technique involved positioning information from each hydrophone on a different carrier frequency. Each carrier frequency was slightly displaced in frequency from the other carrier frequencies and before the information was received by the processing equipment this information was filtered or demodulated so that the output of each hydrophone would appear separately. One of the problems with the aforementioned system was that it did not have a high dynamic range, i.e., the ratio of the smallest amplitude signal that the system could process with a specified amount of noise to the largest amplitude signal the system could process with a specified amount of clipping or distortion expressed in db was relatively small. The same prior art system would not process faint noises that were produced by naval craft when they were far away from the sound detection system and loud noises that were produced by naval craft when they were close to the detection system. Thus, the prior art sound detection systems were limited in the amount of information that they could process. Hence, the same prior art sound detection system could not, for example, track a submarine as it moved from far away to close to the sound sensing devices, i.e., hydrophones.

Cross-talk or interference between two adjacent multiplexed channels due to mutual coupling between the frequency channels caused the sound detection systems to confuse the sensor of the information. For instance, the sound detection system might not be sure which hydrophone in the array received a particular signal, i.e., hydrophone number 48 or 49, etc. Prior art detection systems were able to overcome the foregoing cross-talk problem by increasing the frequency separation between adjacent channels. The foregoing solution caused the frequency bandwidth of the detection systems to increase. This meant that the number of hydrophones in the array must be decreased since there is a limit on how many different frequencies may be transmitted on a cable without the cable producing excessive transmission losses. One of the disadvantages of decreasing the number of hydrophones in the array is that the sensitivity of the array is reduced making it more difficult to locate objects in the water.

SUMMARY OF THE INVENTION

This invention overcomes the disadvantages of the prior art by providing a high dynamic range multiplexing-demultiplexing system that couples a hydrophone array comprising a large amount of hydrophones to processing equipment without having the system experience excessive cross-talk problems. The apparatus of this invention achieves the foregoing by providing two high gain and two low gain channels for each pair of hydrophones so that each hydrophone will be coupled to a particular high and low gain channel. An amplifier having a high gain is coupled to the high gain channel of each hydrophone. A high gain quadrature multiplexer is coupled to the output of each amplifier. A low gain quadrature multiplexer is coupled to the low gain channel of each hydrophone. The output of each quadrature multiplexer in the high gain channel is coupled respectively to the input of a different quadrature demultiplexer that is located in the high gain channel and the output of each quadrature demultiplexer that is in the low gain channel is coupled respectively to the input of a different quadrature demultiplexer that is in the low gain channel. The foregoing arrangement ensures that the two signals passing through any one of the quadrature multiplexers are at approximately the same level. Thus, the full quadrature cross-talk isolation is retained between quadrature channels.

The reason why the above system has a high dynamic range is that the received signals are divided into two or more classes, i.e., those with a small to medium amplitude and those with a medium to large amplitude. The small to medium amplitude or faint signals are processed by the high gain channel and the medium to large amplitude or loud signals are processed by the low gain channel. Thus, this system would have no difficulty processing either of the aforementioned classes of signals since the high gain channel and low gain channel would process signals that have approximately the same amplitude.

The foregoing arrangement may be used in many other types of detection systems. For instance, the hydrophone array may be replaced by a plurality of radar receiving antennas that form an array. Also, instead of detecting vehicles in the water or objects in space, the apparatus of this invention may be used in offshore oil exploration. When this system is used to locate oil formations, an explosive charge is detonated in the water. The shock waves produced by the charge are reflected by various geological formations in and under the water. The reflected signals or echoes are detected by the array of hydrophones and their amplitudes and distance travelled give geologists an indication of what type of material the echoes were reflected from. The high dynamic range of the foregoing system would give the geologists more information than they received by the prior art systems that utilized an equal amount of hydrophones.

It is an object of this invention to produce a high dynamic range system that is capable of transmitting electrical signals from sensing devices to processing equipment.

Other objects and advantages of this invention will become apparent as the following description proceeds, which description should be considered together with the accompanying drawing.

BRIEF DESCRIPTION OF THE DRAWING

The single drawing in this application is a schematic representation of the apparatus of this invention.

DESCRIPTION OF A PREFERRED EMBODIMENT

Referring now to the single drawing in this application, the reference characters 1-200 designates a plurality of hydrophones that comprise a hydrophone array system. Typically, a hydrophone array would contain between 50 and 500 hydrophones. For the purposes of this disclosure, we will assume that the array contains 200 hydrophones. This system is arranged to handle pairs of hydrophones; thus, there will be similar electronics for each pair of hydrophones in the array. Hence, hydrophones 3-198 and their associated circuitry are not shown because the same hydrophones and other associated circuitry shown in the drawing are used. In the event an odd number of hydrophones are used in an array, the last hydrophone would be coupled to the same circuitry that is depicted in the drawing. However, the second hydrophone of the hydrophone pair would not be connected to the circuit.

Hydrophones 1-200 detect underwater sounds. All underwater sounds are generated in the time domain and are observed by hydrophones 1-200 as waveforms, the amplitude of which changes with the passage of time. The information contained in the time domain waveform is characteristic of the source which generated the waveform. Thus, the waveform may provide valuable clues not only for the identification of the source, but also for inferring something about the behavior of the source. Hydrophones 1-200 will not observe the waveforms at the same time since the hydrophones are not physically in the same place. Hydrophone array cable 800 might, for example, be approximately 2000 feet long and hydrophones 1-200 spaced approximately 10 feet apart. It is possible for hydrophone 1 to detect a faint signal and hydrophone 200 to detect a loud signal at the same time. However, for an adjacent pair of hydrophones, i.e., hydrophones 1 and 2, hydrophones 1 and 2 would detect the same noise at approximately the same time, since the hydrophones are physically close to each other, e.g., 10 feet.

The output of hydrophone 1 is coupled to the input of amplifier 201 and the 0° phase input of quadrature multiplexer 302. The output of hydrophone 2 is coupled to the input of amplifier 202 and the 90° phase input of quadrature multiplexer 302. Quadrature multiplexers 301 and 302 are respectively coupled to the inputs of demultiplexers 401 and 402. Amplifier 201, amplifier 202, multiplexer 301 and demultiplexer 401 constitute the high gain channels for hydrophones 1 and 2 and multiplexer 302 and demultiplexer 402 constitute the low gain channels for hydrophones 1 and 2. Thus, the output of hydrophone 1 is simultaneously coupled to the 0° phase low gain channel of multiplexer 302 and the 0° phase high gain channel of multiplexer 301. The output of hydrophone 2 is simultaneously coupled to the 90° phase high gain channel of multiplexer 301 and the 90° phase low gain channel of multiplexer 302. For purposes of this disclosure, we will assume that amplifiers 201 and 202 each has a gain of 100, hydrophones 1 and 2 have an output signal of 0.01 volts and multiplexers 301 and 302 have inherent unwanted cross-talk of 10%. In the above example, with hydrophones 1 and 2 receiving a faint signal and having an output signal of 0.01 volts, the high gain channel of this invention will be utilized. Thus, amplifiers 201 and 202 will have an output of 1 volt and there will be 0.1 volts of cross-talk (considered in this example to be an acceptable amount) between the 0° and 90° phase channels of multiplexer 301. With a large input signal the output of hydrophones 1 and 2 might, for example, be 1 volt. In this instance, the low gain channel of this invention would be utilized. Hence, quadrature multiplexer 302 would receive input signals of 1 volt and experience 0.1 volts of cross-talk (considered here to be an acceptable amount) between its 0° and 90° phase channels.

Multiplexer 301 multiplexes its incoming signals on a high frequency carrier wave $f_H$ and multiplexer 302 multiplexes its incoming signals onto a lower frequency carrier wave $f_L$. As previously stated, there are 200 hydrophones in the array of this example. Thus, any given hydrophone pair, i.e., hydrophones 1 and 2, will be receiving either a faint-to-intermediate signal and use its high gain channel or a loud-to-intermediate signal and use its low gain channel. Hence, either the low gain or high gain channel will be processing a valid signal. In those instances in which an intermediate amplitude signal is processed, both the high and low gain channels will have valid output signals. The outputs of multiplexers 301 and 302 are respectively transmitted to demultiplexers 401 and 402 via transmission paths 801 and 802. Transmission paths 801 and 802 may be a cable, the atmosphere or any fluid, etc.

Demultiplexer 401 demultiplexes the high gain signals that were transmitted via path 801. Demultiplexer 401 transmits the 0° phase signals to processing equipment 501 and the 90° phase signals are transmitted to processing equipment 502. Demultiplexer 402 demultiplexes the low gain signals that were transmitted via path 802. The 0° phase signals are transmitted to processing equipment 503 and the 90° phase signals are transmitted to processing equipment 504. Equipment 501, 502, 503 and 504 may be an oscilloscope, signal analyzer or computer, etc. The fainter signals impinging upon hydrophone 1 will be processed by equipment 501 and the fainter signals impinging upon hydrophone 2 will be processed by equipment 502. The strong signals at hydrophone 1 will be processed by equipment 503 and the strong signals at hydrophone 2 will be processed by equipment 504.

Multiplexer 302 is capable, for example, of processing signals between 0.01 and 1 volts. Hence, the dynamic range of the low gain channel would be 20 log 1/0.01=20 db. Multiplexer 301 is assumed to be capable of processing signals between 0.01 and 0.0001 volts, which is also a 20 db range. Hence, the dynamic range of the above system would be 10 log 1/0.0001=40 db. Therefore, the high and low gain channels would effectively double the dynamic range of the multiplexers when they are expressed in db.

The output of hydrophone 199 is coupled to the input of amplifier 299 and to one of the inputs of multiplexer 400. The output of hydrophone 200 is coupled to one of the inputs of multiplexer 400 and to the input of amplifier 300. Multiplexer 399's two inputs are the outputs of amplifier 299 and amplifier 300. The output of multiplexer 399 is coupled to the input of demultiplexer 499 via transmission path 899 and the two outputs of demultiplexer 499 are respectively coupled to the inputs of processing devices 697 and 698. The output of multiplexer 400 is coupled to the input of demultiplexer 500 via transmission path 900 and the two outputs of demultiplexer 500 are respectively coupled to the inputs of processing devices 699 and 700. Amplifier 299, amplifier 300, multiplexer 399, path 899, demultiplexer 499, device 697, and device 698 constitute the high gain channels and multiplexer 400, path 900, demultiplexer 500, device 699 and device 700 constitute the low gain channels. The high and low gain channels for hydrophones 199 and 200 function in the same manner as the high and low gain channels for hydrophones 1 and 2.

The above specification has described a new and improved detection system that has a high dynamic range. It is realized that the above description may indicate to those skilled in the art additional ways in which the principles of this invention may be used without departing from its spirit. It is, therefore, intended that this invention be limited only by the scope of the appended claims.

What is claimed is:

1. A system for the transmission of electrical information from an array of sensing devices to processing devices via a plurality of transmission paths that are coupled to the output of an adjacent pair of sensing devices said system comprising:
   (a) a first and second quadrature multiplexer located in each transmission path, said first multiplexer has two high gain channels that are respectively coupled to the output of the first and second sensing devices, and said second multiplexer has two low gain channels that are coupled to the output of the first and second sensing devices; and
   (b) a first and second quadrature demultiplexer, said first demultiplexer demultiplexes the output of said first multiplexer and transmits the signals received from the first sensing device to a first processing device and the signals received from the second sensing device to a second processing device, said second demultiplexer demultiplexes the output of said second multiplexer and transmits the signals detected by the first sensing device to a third processing device and the signals detected by the second sensing device to a fourth processing device, whereby said first and second processing devices will process the faint signals detected by the sensing devices and said third and fourth processing devices will process the loud signals detected by the sensing devices causing this system to have a high dynamic range.

2. The system claimed in claim 1 wherein a first high gain amplifier is coupled to said first high gain channel and a second high gain amplifier is coupled to said second high gain channel.

3. The system claimed in claim 1 wherein a first low gain amplifier is coupled to said first low gain channel and a second low gain amplifier is coupled to said second low gain channel.

4. The system claimed in claim 1 wherein said processing devices are computers.

5. The system claimed in claim 1 wherein said processing devices are signal analyzers.

6. The system claimed in claim 1 wherein said processing devices are oscilloscopes.

7. A system for the transmission of electrical information from an array of sensing devices to processing equipment via a plurality of transmission paths that have at least first and second channels, said paths are coupled to the outputs of an adjacent pair of sensing devices, said system comprising:
   (a) a first and second means located in said first channel for amplifying the outputs of an adjacent pair of sensing devices said first means amplifies the output of the first sensing device and said second means amplifies the output of the second sensing device;
   (b) a first and second quadrature multiplexer, said first multiplexer is located in said first channel to multiplex the signals that it receives from said first means onto a first carrier and to multiplex the signals that it receives from said second means onto a second carrier, said second multiplexer is located in said second channel to multiplex the signals that it receives from the first sensing device onto a third channel, and the signals that it receives from the second sensing device onto a fourth channel; and
   (c) a first and second quadrature demultiplexer, said first demultiplexer is located in said first channel to demultiplex the signals that it receives from said first multiplexer, said first demultiplexer transmits the demultiplexed signals from the first sensing device to a first processing device and the signals from the second sensing device to a second processing device, said second demultiplexer is located in said second channel to demultiplex the signals that it receives from said second multiplexer, said second demultiplexer transmits the demultiplexed signals from the first sensing device to a third processing device and the signals from the second sensing device to a fourth processing device, whereby the faint signals detected by said sensing devices will be processed by said first and second processing devices and the loud signals received by said sensing devices will be processed by said third and fourth processing devices so that said system will have a high dynamic range capability.

8. The system claimed in claim 7 wherein said first and second means is an amplifier.

9. The system claimed in claim 7 wherein said processing devices are computers.

10. The system claimed in claim 7 wherein said processing devices are signal analyzers.

11. The system claimed in claim 7 wherein said processing devices are oscilloscopes.

* * * * *